United States Patent
Yang (10) Patent No.: US 9,977,976 B2
(45) Date of Patent: May 22, 2018

(54) PATH SCORE CALCULATING METHOD FOR INTELLIGENT CHARACTER RECOGNITION

(71) Applicant: KONICA MINOLTA LABORATORY U.S.A., INC., San Mateo, CA (US)

(72) Inventor: Duanduan Yang, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days. days.

(21) Appl. No.: 15/196,368

(22) Filed: Jun. 29, 2016

(65) Prior Publication Data

US 2018/0005058 A1    Jan. 4, 2018

(51) Int. Cl.
*G06K 9/00* (2006.01)
*G06K 9/34* (2006.01)

(52) U.S. Cl.
CPC ..... *G06K 9/00859* (2013.01); *G06K 9/00409* (2013.01); *G06K 9/00422* (2013.01); *G06K 9/344* (2013.01); *G06K 2209/01* (2013.01)

(58) Field of Classification Search
CPC .......... G06K 9/00859; G06K 2209/01; G06K 9/00402; G06K 9/00409; G06K 9/6807; G06K 9/00422; G06K 9/3283; G06K 9/46; G06K 9/00872; G06K 9/348; G06K 9/344; G06K 9/0859
See application file for complete search history.

(56) References Cited

U.S. PATENT DOCUMENTS

| 5,850,477 | A | * | 12/1998 | Takada | G06F 3/04883 382/186 |
| 6,285,786 | B1 | * | 9/2001 | Seni | G06K 9/00879 382/187 |
| 6,393,395 | B1 | * | 5/2002 | Guha | G06K 9/00872 382/186 |
| 6,519,363 | B1 | * | 2/2003 | Su | G06K 9/68 382/177 |
| 7,174,043 | B2 | * | 2/2007 | Lossev | G06K 9/222 382/186 |

(Continued)

FOREIGN PATENT DOCUMENTS

JP        2008-84105 A    4/2008

*Primary Examiner* — Jingge Wu
(74) *Attorney, Agent, or Firm* — Chen Yoshimura LLP (57) ABSTRACT

Disclosed herein is a method that improves the performance of handwriting recognition by calculating path scores so as to identify the path with the highest score as the basis for interpreting handwritten characters. Specifically, the method comprises the following steps: detecting connected regions in an input image comprising handwritten characters; determining a plurality of segmentation positions of the input image; obtaining a plurality of recognition results for each segment of each path in the input image, wherein each recognition result represents a character candidate for the segment and each path comprises one or more segments; obtaining a plurality of scores corresponding to the recognition results; calculating scores for each path in the input image based on segment lengths and the scores corresponding to the recognition results; and using the path with the highest score to interpret the handwritten characters in the input image.

19 Claims, 9 Drawing Sheets

(56) References Cited

U.S. PATENT DOCUMENTS

| | | | |
|---|---|---|---|
| 7,336,827 B2* | 2/2008 | Geiger | G06K 9/00872 382/177 |
| 2004/0146200 A1* | 7/2004 | Andel | G06K 9/344 382/177 |
| 2005/0206627 A1* | 9/2005 | Simmons | G06F 3/04812 345/179 |
| 2008/0123940 A1* | 5/2008 | Kundu | G06K 9/00865 382/159 |
| 2010/0080462 A1* | 4/2010 | Miljanic | G06K 9/00429 382/186 |
| 2010/0310172 A1* | 12/2010 | Natarajan | G06K 9/00865 382/187 |
| 2013/0182956 A1* | 7/2013 | Wang | G06K 9/00865 382/185 |
| 2015/0199582 A1* | 7/2015 | Okamoto | G06K 9/00442 382/182 |
| 2016/0063342 A1* | 3/2016 | Sugiura | G06K 9/62 382/187 |
| 2017/0061665 A1* | 3/2017 | Kubo | G06F 3/0488 |

* cited by examiner

Fig. 7A the contour from the top

Fig. 7B contour from the bottom

PATH SCORE CALCULATING METHOD FOR INTELLIGENT CHARACTER RECOGNITION

BACKGROUND OF THE INVENTION

Field of the Invention

This invention relates to a method that improves the performance of handwriting recognition by calculating path scores.

Description of Related Art

Handwriting recognition plays an important role in the field of artificial intelligence. It represents the ability of a computer to receive and interpret intelligible handwritten input from sources such as paper documents, photographs, touch-screens and other devices. Given the great variances in human handwriting styles, however, it can be very difficult for a computer to understand and recognize handwritten characters with 100% accuracy. Especially for cursive handwriting recognition, usually the accuracy rate is no more than 60% under the current state of art, which does not meet most customer requirements. Therefore, a need exists for enhancing the performance of handwriting recognition.

SUMMARY

Accordingly, the present invention is directed to a machine learning method that improves the performance of handwriting recognition that substantially obviates one or more of the problems due to limitations and disadvantages of the related art.

An object of the present invention is to provide a path score calculation method based on recognition results and corresponding scores of a decoding path as well as the lengths of segments.

Another object of the present invention is to provide a method that enhances the baseline estimation in handwriting recognition by clustering the top and bottom positions of connected regions.

Yet another object of the present invention is to use ink contours of an input image to determine segmentation positions for purposes of generating non-characters and path-searching codes.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method that improves the performance of handwriting recognition by calculating path scores so as to identify the path with the highest score as the basis for interpreting handwritten characters. Specifically, the method comprises the following steps: detecting connected regions in an input image comprising handwritten characters; determining a plurality of segmentation positions of the input image; obtaining a plurality of recognition results for each segment of each path in the input image, wherein each recognition result represents a character candidate for the segment and each path comprises one or more segments; obtaining a plurality of scores corresponding to the recognition results; calculating scores for each path in the input image based on segment lengths and the scores corresponding to the recognition results; and using the path with the highest score to interpret the handwritten characters in the input image.

In another aspect, the present invention provides a computer program product comprising a computer usable non-transitory medium (e.g. memory or storage device) having a computer readable program code embedded therein for controlling a data processing system, the data processing system comprising a computer and one or more printers, the computer readable program code configured to cause the computer in the data processing system to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention are directed to a method that improves the performance of handwriting recognition by calculating path scores so as to identify the path with the highest score as the basis for interpreting handwritten characters. Specifically, the method comprises the following steps: detecting connected regions in an input image comprising handwritten characters; determining a plurality of segmentation positions of the input image; obtaining a plurality of recognition results for each segment of each path in the input image, wherein each recognition result represents a character candidate for the segment and each path comprises one or more segments; obtaining a plurality of scores corresponding to the recognition results; calculating scores for each path in the input image based on segment lengths and the scores corresponding to the recognition results; and using the path with the highest score to interpret the handwritten characters in the input image.

One embodiment of the present invention performs a baseline estimation process by detecting top and bottom positions of each connected region of an input image, clustering the top positions into a first higher center and a first lower center, wherein the first lower center is selected as the upper baseline, and clustering the bottom positions into a second higher center and a second lower center, wherein the second higher center is selected as the lower baseline.

Another embodiment of the present invention determines segmentation positions in an input image through the following process: obtaining a top contour and a bottom contour of the input image; selecting a plurality of extremum points in the top and bottom contours as potential segmentation positions; for each of the plurality of potential segmentation positions, drawing a vertical line at the potential segmentation position, determining whether the vertical line crosses a foreground of the input image more than two times and if so, deleting the potential segmentation position, and determining whether the vertical line crosses a circle in the foreground and if so, deleting the potential segmentation position.

Figure 1:
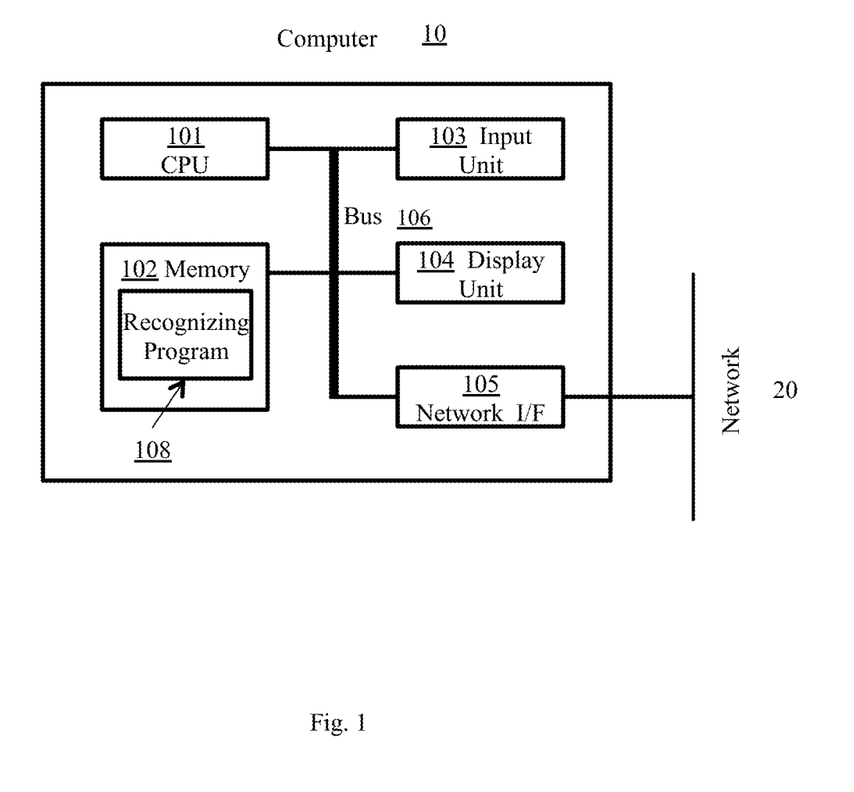
FIG. 1 is a block diagram of a computer in which embodiments of the present invention may be implemented.

Turning to FIG. 1, provided is a block diagram of an exemplary computer in which embodiments of the present invention may be implemented. As shown in FIG. 1, this computer 10 comprises a Central Processing Unit (CPU) 101, a memory 102, an input unit 103 such as a keyboard or a tablet stylus pen, a display unit 104 such as a computer monitor or touchscreen display, and a network interface 105, all these components (including those not shown) communicating with each other internally via a bus 106. Through the network interface 105, the computer 10 is connected to a network 20, such as a LAN or WAN, and communicate with other devices connected to the network.

Usually the memory 102 stores computer-executable instructions or software programs accessible to the CPU 101, which is configured to execute these software programs as needed in operation. Preferably, such software programs are designed to run on Windows OS, Macintosh OS, or Unix X Windows or other popular computer operating systems implementing a GUI (graphic user interface), such as a touchscreen and/or a mouse and a keyboard, coupled with a display monitor. In one embodiment, such software in the memory 102 includes a recognizing program 108, which, when executed by the CPU 101, enables the computer 10 to recognize human handwritten characters. As will be described in detail below, the recognizing program 108 enables the computer 10 to recognize human handwritings by obtaining an image of handwritten characters (e.g., a scanned image), detecting connected regions and segmentation positions in the image, calculating a path score for each path in the image based on the score and length of each segment included in the path, and using the path with the highest path score as the basis to find the most plausible words for the handwritten characters.

In addition to the recognizing program 108, the CPU 101 is also configured to execute other types of software (e.g., administrative software), applications (e.g., network communication application), operating systems, etc.

Figure 2:
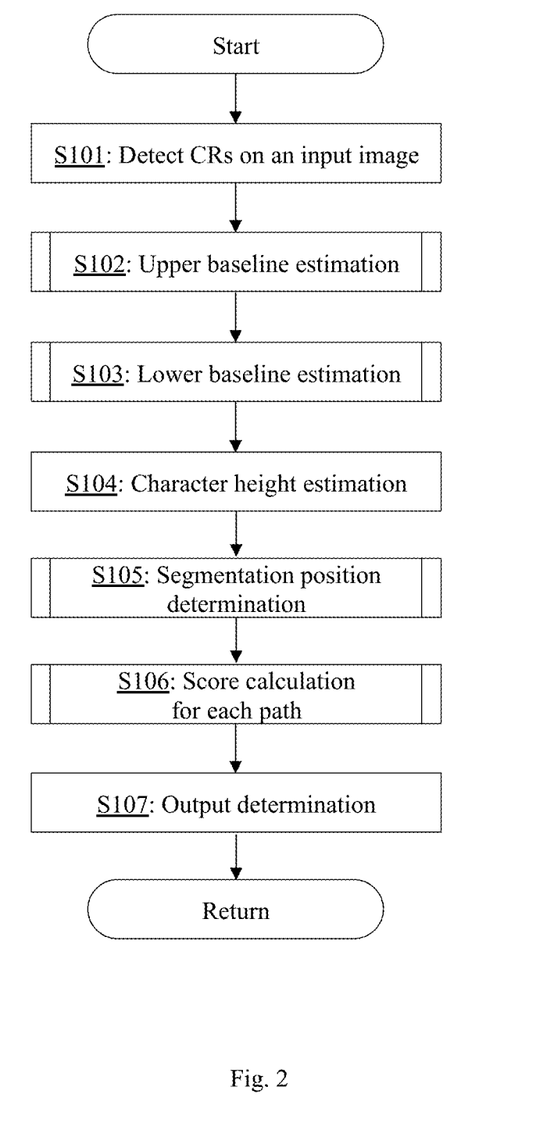
FIG. 2 is a flow chart diagram illustrating an exemplary machine-learning algorithm that improves the performance of handwriting recognition according to embodiments of the present invention.

In FIG. 2, a flow chart diagram illustrates, on a high level, an exemplary algorithm underlying the recognizing program 108 of FIG. 1. Details of each step in this algorithm will be described with reference to the sub-routines in FIGS. 3-6 as well as the examples in FIGS. 7-9.

Figure 7A:
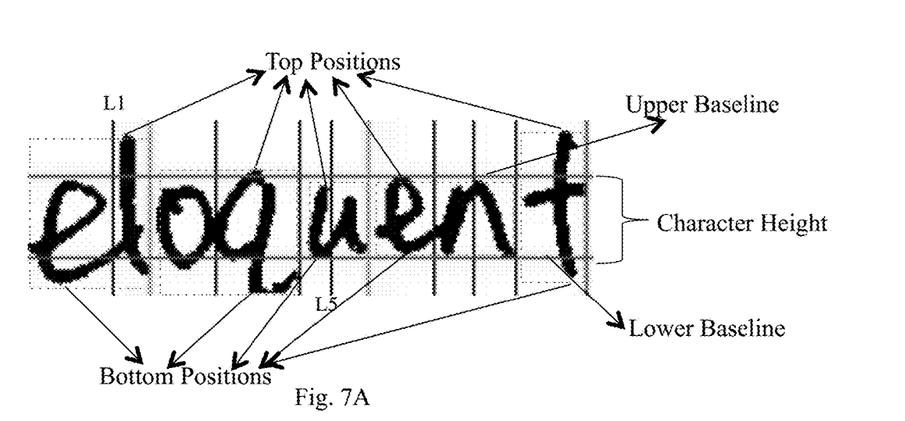
FIG. 7A depicts an exemplary input image of handwritten texts to be recognized using the algorithm of FIG. 2 according to embodiments of the present invention.

As shown in FIG. 2, the algorithm starts at step S101 where connected regions are detected from an input image. Such an input image can be an image of written texts sensed "off line" from a piece of paper by optical scanning or in intelligent word recognition, or an image sensed "on line" via the movements of a pen tip, for example, by a pen-based computer screen surface. In one embodiment, the input image is a binary image where each pixel has a value of either black or white. Here, it is assumed that the document background is white and foreground is black, although the method described below can be readily modified for white content on black background. Once such an input image is received, the computer performs an image analysis to extract connected regions from the input image. For example, as shown in FIG. 7A, the computer may detect multiple connected regions, such as "el" "oq" "u" "en" and "t" from the image of "eloquent." After the connected regions are detected from the input image, at steps S102 and S103, the computer performs upper baseline estimation and lower baseline estimation, respectively, with respect to the connected regions, as further illustrated in the sub-routines in FIGS. 3 and 4.

Figure 3:
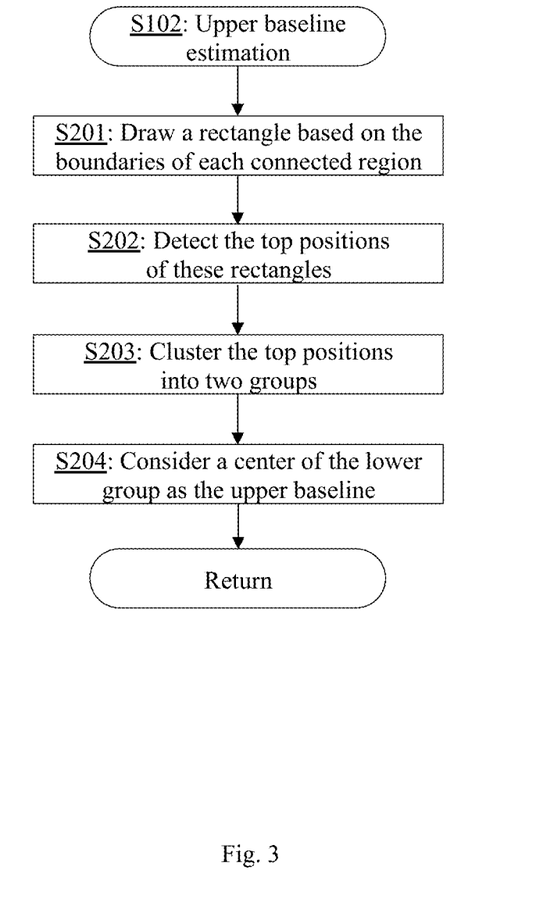
FIG. 3 is a flow chart diagram illustrating an exemplary sub-routine for upper baseline estimation as part of the algorithm of FIG. 2 according to embodiments of the present invention.

FIG. 3 is a flow chart diagram illustrating an exemplary sub-routine for upper baseline estimation as part of the handwriting recognition algorithm. At step S201, the computer draws a rectangle based on the boundaries of each connected region, as illustrated in FIG. 7A. Then, at step S202, the top positions of these rectangles are detected and assigned with different values. For example, the connected regions "el" "oq" "u" "en" and "t" in the image of "eloquent" may have the following top positions:

|  | Connected Region | | | | |
| --- | --- | --- | --- | --- | --- |
|  | "el" | "oq" | "u" | "en" | "t" |
| Top Position | 1 | 2 | 3 | 4 | 5 |
| Value | 1.0 | 2.0 | 2.1 | 2.2 | 1.02 |

At step S203, the top positions are clustered into two groups or centers based on their position values. In one embodiment, the clustering is done by applying a K-means function to the position values. For example, in the case of the "eloquent" image as illustrated above, the two centers include a higher center (1.0, 1.02) and a lower center (2.0, 2.1, 2.2). The lower center is determined to be the upper baseline at step S204. As a result, as shown in FIG. 7A, an upper baseline is drawn based on the lower center of the top positions in the image.

Figure 4:
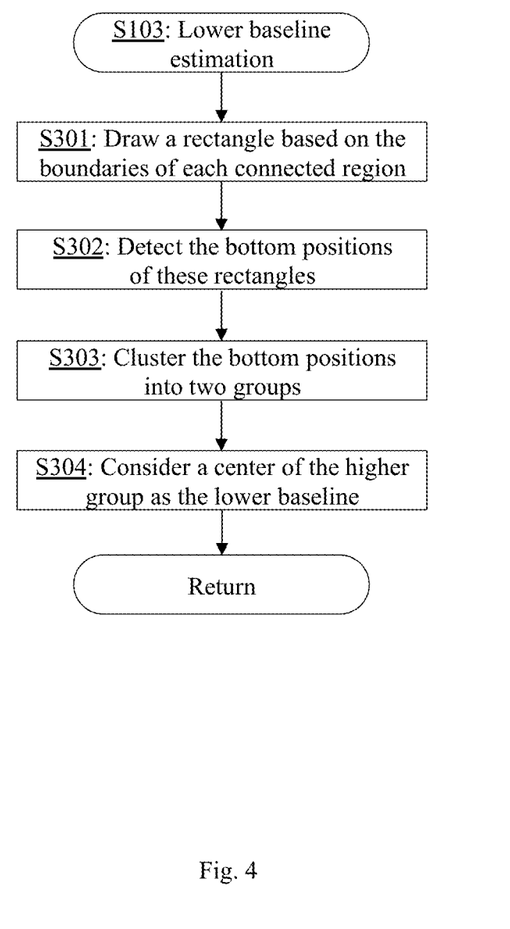
FIG. 4 is a flow chart diagram illustrating an exemplary sub-routine for lower baseline estimation as part of the algorithm of FIG. 2 according to embodiments of the present invention.

Back to FIG. 2, after the upper baseline estimation is complete, the handwriting recognition algorithm proceeds to step S103 for lower baseline estimation. This sub-routine is presented in the flow chart diagram of FIG. 4. As shown in FIG. 4, this sub-routine starts at step S301, where, similar to step S201 in FIG. 3, the computer draws a rectangle based on the boundaries of each connected region, as illustrated in FIG. 7A. Then, at step S302, the bottom positions of these rectangles are detected and assigned with different values.

For example, the connected regions "el" "oq" "u" "en" and "t" in the image of "eloquent" may have the following bottom positions:

|  | ConnectedRegion | | | | |
| --- | --- | --- | --- | --- | --- |
|  | "el" | "oq" | "u" | "en" | "t" |
| Bottom Position Value | 1 2.0 | 2 1.0 | 3 2.1 | 4 2.2 | 5 1.02 |

At step S303, the bottom positions are clustered into two groups or centers based on their position values. In one embodiment, the clustering is done by applying a K-means function to the position values. For example, in the case of the "eloquent" image as illustrated above, the two centers include a lower center (1.0, 1.02) and a higher center (2.0, 2.1, 2.2). The higher center is deemed as the bottom baseline at step S304. As a result, as shown in FIG. 7A, a lower baseline is drawn based on the higher center of the bottom positions in the image.

Figure 6:
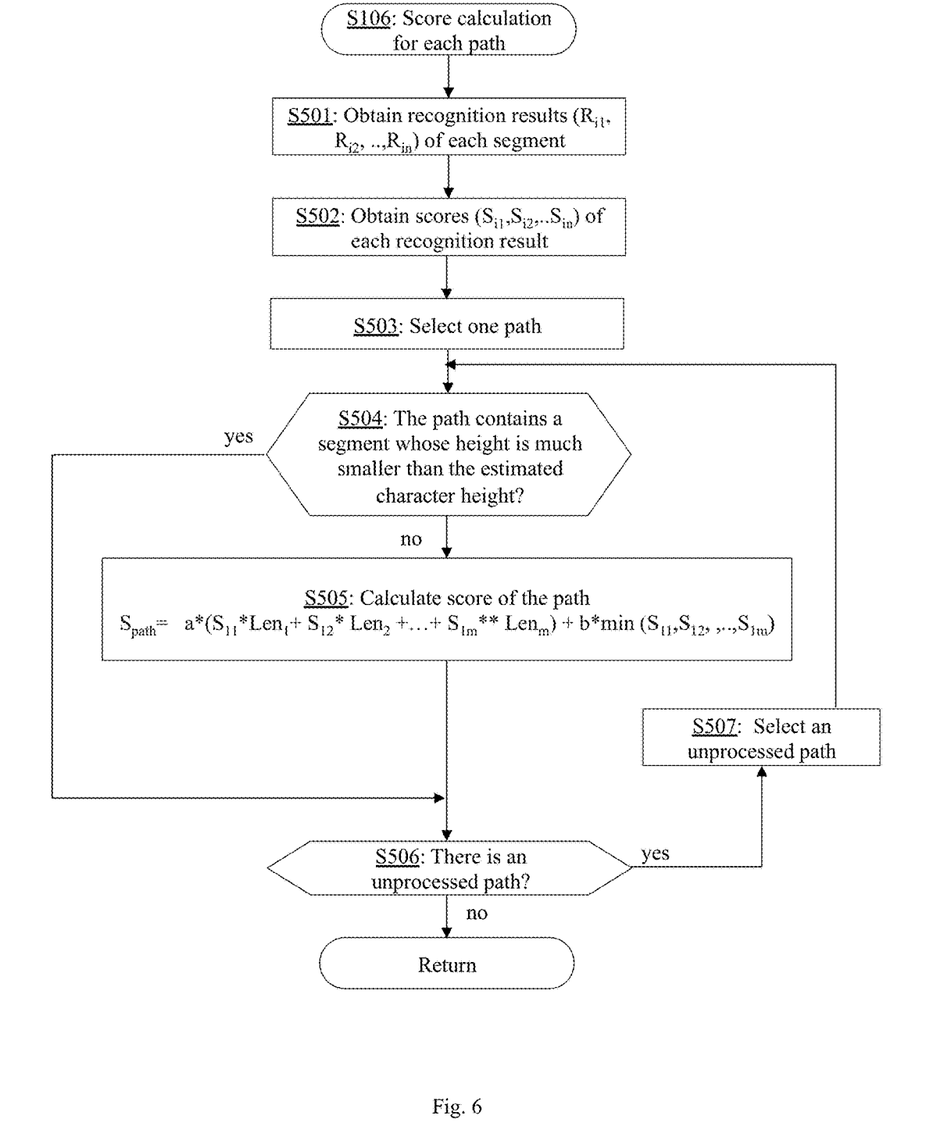
FIG. 6 is a flow chart diagram illustrating an exemplary sub-routine for path score calculation as part of the algorithm of FIG. 2 according to embodiments of the present invention.

Back to FIG. 2, after both the upper baseline and lower baseline are estimated following the sub-routines in FIGS. 3-4, the next step S104 is to estimate the height of the characters in the input image. Essentially the distance between the two estimated baselines is considered as the height of the characters. As will be described below, the character height is used to prune paths in calculating path scores as shown in FIG. 6.

Next, at step S105, the algorithm includes a step of determining the segmentation positions in the input image. This segmentation position determination step is further illustrated in the sub-routine in FIG. 5.

Figure 5:
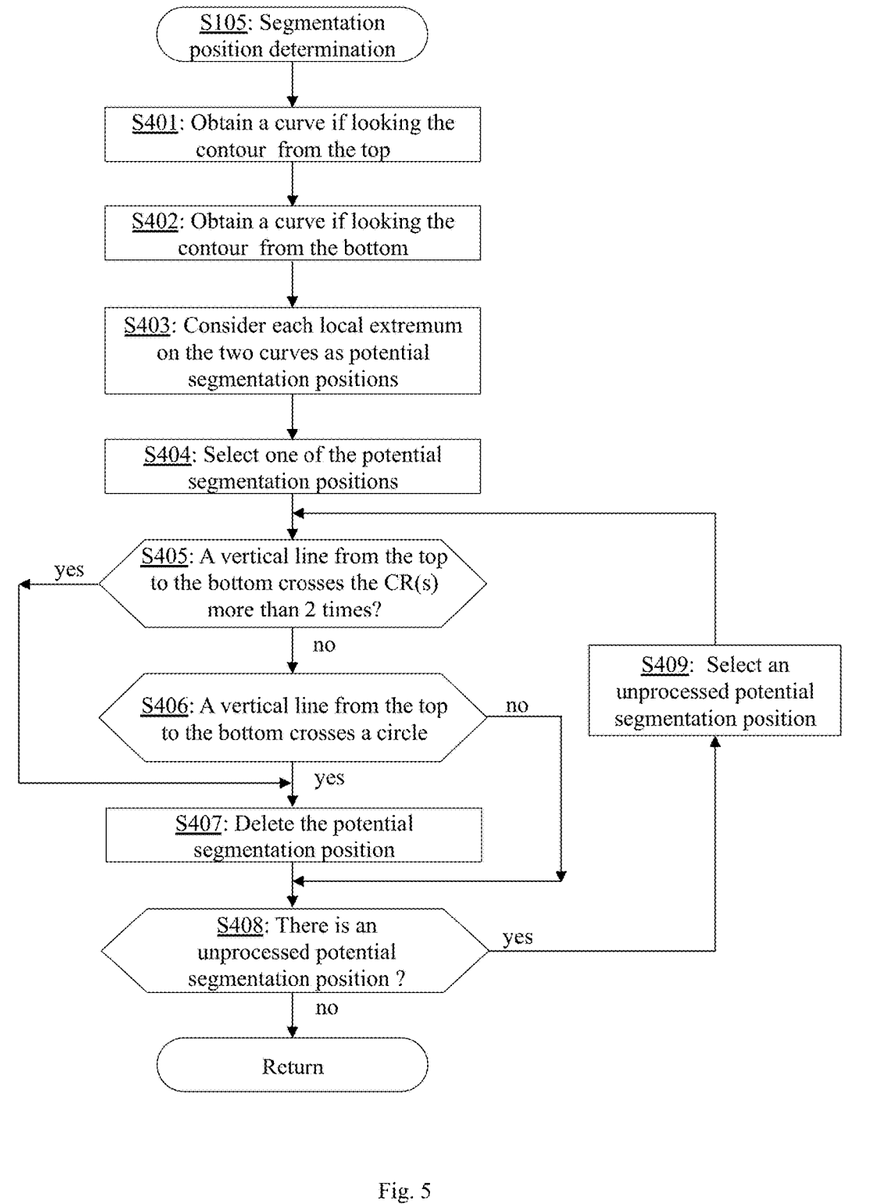
FIG. 5 is a flow chart diagram illustrating an exemplary sub-routine for segmentation position determination as part of the algorithm of FIG. 2 according to embodiments of the present invention.
Figure 7B:
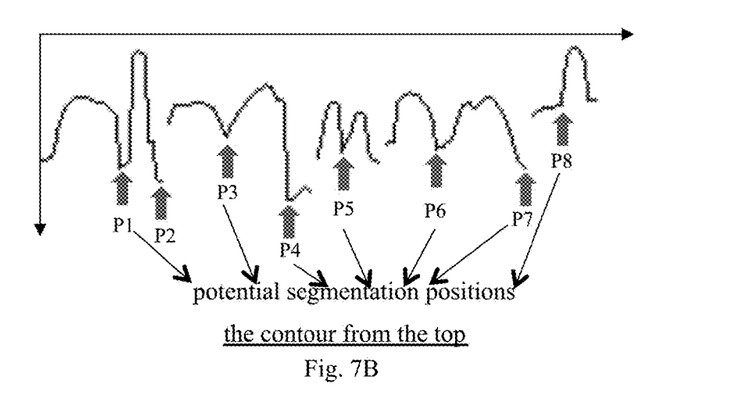
FIGS. 7B-C depict exemplary top and bottom contours used to determine segmentation positions of the input image of FIG. 7A according to embodiments of the present invention.
Figure 7C:
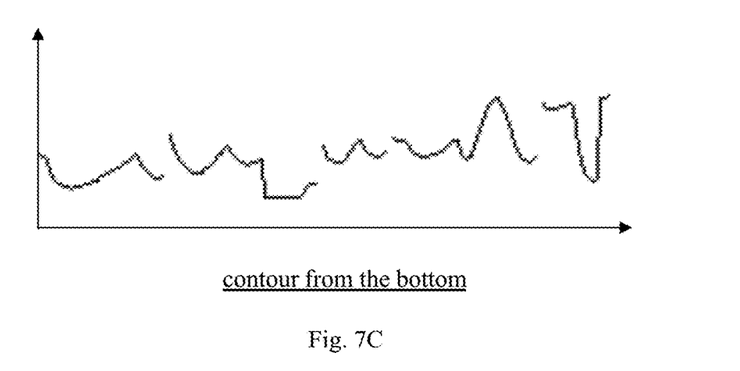

As shown in FIG. 5, at steps S401 and S402, two curves, i.e., a top contour and a bottom contour, are obtained from the input image. For example, a top contour or curve, as illustrated in FIG. 7B, can be obtained from the top view of the image of "eloquent" in FIG. 7A. One way of obtaining such a top contour is to generate a side profile along the top side of the input image, namely, a top side profile. A side profile represents, for each pixel position along a side (top or bottom) of the input image, the distance from that side (edge of the input image) to the first black pixel along the direction perpendicular to that side. In one implementation, each side profile is a curve where one axis is the pixel position and the other axis is the distance to the first black pixel in the perpendicular direction. Similarly, a bottom contour or curve, as illustrated in FIG. 7C, can be obtained from the bottom view of the image of "eloquent" in FIG. 7A by generating a bottom side profile for the input image. Thereafter, at step S403, a plurality of potential segmentation positions can be obtained from the two contours or curves. In one embodiment, each extremum point on the curve is considered to be a potential segmentation position, for example, positions P1, P2 ... P8, which, collectively, are denoted as Set A of potential segmentation positions. In the following steps, some of these positions in Set A may be deleted pursuant to certain pre-defined criteria.

At step S404, one of the positions in Set A is selected, for example, P1 in FIG. 7B. Then, a vertical line is drawn at the position P1, such as the line L1 in FIG. 7A, to cross the connected region, or more precisely, the foreground (e.g., the black pixel area) of the input image "eloquent" from top to bottom. At step S405, the algorithm determines whether the line crosses the foreground more than two (2) times. In the case of the position P1 and line L1, the crossing time is only one (1), and as such, the algorithm continues to step S406, where a further determination is made on whether the vertical line crosses a circle in the connected region. Again, in the case of the position P1 and line L1, no circle is crossed. Thus, the position P1 is kept as a segmentation position. But if the vertical line L1 did cross a circle, for example, the character "o" of the image, then the position P1 would be eliminated at step S407.

Continuing to step S408, the sub-routine determines whether there is still any unprocessed position in Set A of the potential segmentation positions. If all positions are processed and there is no unprocessed position left, the sub-routine for determining the segmentation positions ends, otherwise it continues to step S409, where one more unprocessed position from Set A is selected to repeat the determination process comprising the steps S405 to S409.

As another example, if the position P5 in FIG. 7B is selected, a vertical line is drawn at P5, such as the line L5 in FIG. 7A, to cross the connected region of the input image "eloquent" from top to bottom. In this case, this line L5 is determined to cross the foreground (e.g., "u") no more than two (2) times, and thus, the position P5 passes the determination step S405. But if the line L5 did cross the foreground more than two (2) times, for example, crossing the character "e" of the image, then the position P5 would be deleted at step S407. Since the line L5 does not cross any circle in the image, the position P5 also passes the determination step S406, and will be kept as a segmentation position.

It should be understood that the positions and lines described above are for illustration only and may not be so limited as shown in FIGS. 7A-B. Many variations of the segmentation positions may be implemented according to embodiments of the invention.

The segmentation position determination sub-routine in FIG. 5, as described above, is also applied to the bottom contour of the image in FIG. 7C to find the appropriate segmentation positions. Once the segmentation positions are determined for the input image, the handwriting recognition algorithm continues to the next step of path-score calculation, namely, step S106 of FIG. 2, which will be described in detail below with references to FIGS. 6 and 8-9.

As used herein, the term "path" consists of a series of segments covering every pixel of an input image, where each segment comprises a number of different and non-overlapping pixels in the input image. In other words, a path may be formed from various combinations of different segments in the input image. Again, take the input image of "eloquent" in FIG. 7A as an example. There can be multiple different writing paths in this input image, and each path may include one or more segments defined by the segmentation positions as described above. For instance, one path across the image of "eloquent" may include such short segments as "e," "l," "o," "q," ... "t," referring to Path 1 in FIG. 8. Another path, i.e., Path 2 in FIG. 8, may cross the image with longer segments, such as "el," "oq," "u," etc. Also, Path n in FIG. 8 may include only one segment consisting of the entire image of "eloquent." Amongst all these different paths, the goal is to find an optimal path based on which the characters in the input image can be classified with the most accuracy, thereby enhancing the performance of handwriting recognition to the maximum. In order to achieve this goal, the handwriting recognition algorithm according to embodiments of the present invention calculates a path score for each path, and uses the path with the highest score to interpret the handwritten characters of an input image.

Figure 8:
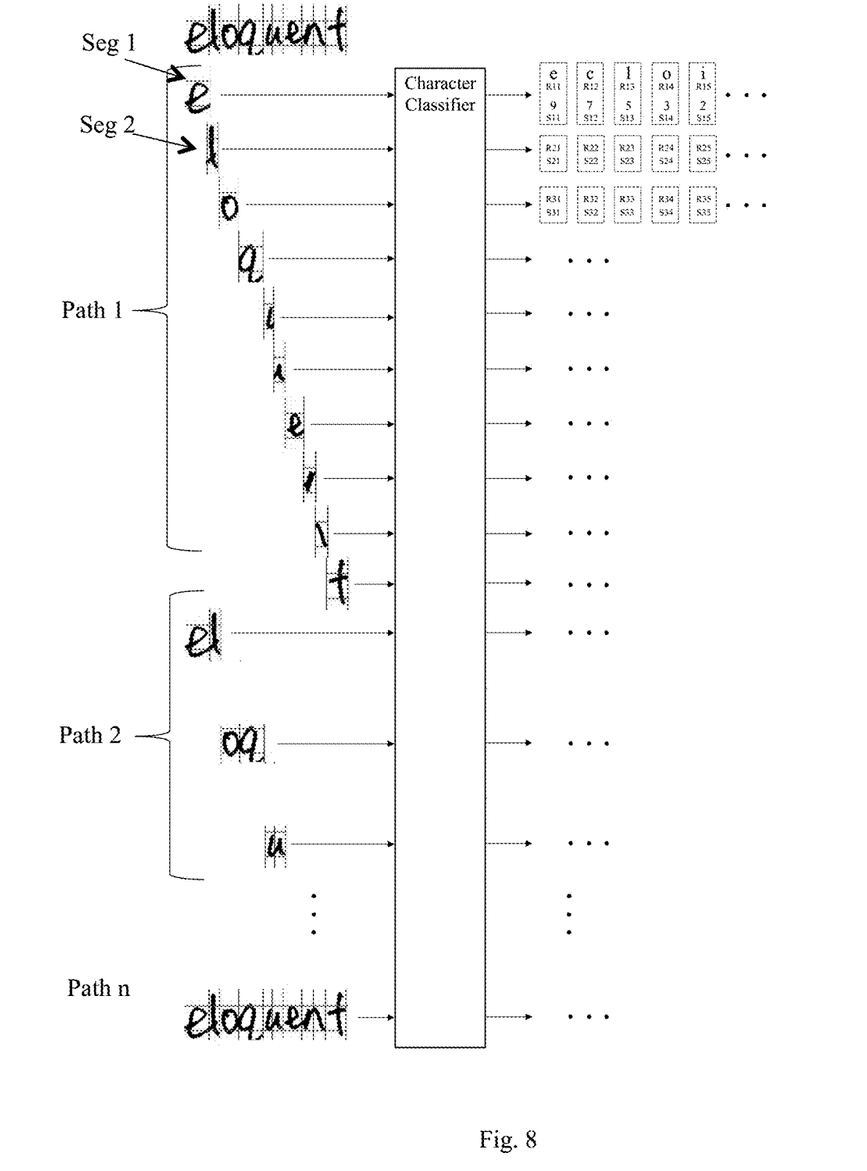
FIG. 8 presents exemplary recognition results and scores generated by a character classifier as part of the path score calculation sub-routine in FIG. 6 according to embodiments of the present invention.

Specifically, as shown in FIG. 6, the algorithm starts at step S501, where a plurality of recognition results are obtained for each segment of each path, for example, ($R_{i1}$, $R_{i2}$, ... $R_{in}$) are obtained for Segment i. Then, at step S502, corresponding scores are obtained for each recognition result, for example, ($S_{i1}$, $S_{i2}$, ... $S_{in}$) corresponding to ($R_{i1}$, $R_{i2}$, ... $R_{in}$) for Segment i. As an example, for the Segment 1 of Path 1 in FIG. 8 (i.e., "e"), the corresponding recognition list generated by the character classifier may comprise the following:

| | Rec. Result | | | | | |
|---|---|---|---|---|---|---|
| | $R_{11}$ | $R_{12}$ | $R_{13}$ | $R_{14}$ | $R_{15}$ | ... |
| Character | e | c | l | o | i | ... |

Further, for each recognition result, a corresponding score is calculated as follows:

| | Score | | | | | |
|---|---|---|---|---|---|---|
| | $S_{11}$ | $S_{12}$ | $S_{13}$ | $S_{15}$ | $S_{15}$ | ... |
| Value | 9 | 7 | 5 | 3 | 2 | ... |

As seen above, based on the scores (in a descending order), the top candidate for Segment 1 of Path 1 is the character "e."

In operation, the recognition list and corresponding scores are generated by the character classifier, which may be embodied as a software module, according to the following process: when an image (denoted as I) is received, it is compared with each element in a set of character candidates (denoted as C containing N elements, N representing the number of classes or categories). For each comparison, a score is given to indicate the similarity between the input image and the compared element. As a result, there will be N pairs of score and element combinations (e.g., $S_1$-$E_1$, $S_2$-$E_2$, ... $S_N$-$E_N$). By sorting the scores (e.g., $S_1$, $S_2$, ... $S_N$), an output comprising a candidate list and a score list can be generated. To give a more specific example, each element (denoted as a class) in C may comprise a template, which is essentially a k-dimensional vector. In one embodiment, such a template can be obtained as follows: certain training data (i.e., input image data) are classified, for example, labeled as Class A, from which a plurality of labeled training samples can be obtained, with each sample being transformed into a k-dimensional vector; thereafter, the mean or average of these k-dimensional vectors will be considered as one template for Class A. When an image is received, it is converted into another k-dimensional vector via a feature extraction process. Then, the distances are measured between the input vector and N templates using Euclidean metric, for example. The measured distances (denoted as $d_1$, $d_2$, ... $d_N$) can be converted into scores $S_1$, $S_2$, ... $S_N$ through the following equation: $S_i = 1/(1+\exp(d_i))$. If the score list (S) is sorted in a descending order, the corresponding candidate or recognition list will also be presented in a similar descending order. It should be noted that the distances can be measured using different metrics, such as Mahalanobisdistance, HMM or softmax regression, etc.

Back to FIG. 6, once the recognition list and score list are generated at steps S501 and S502, the path-score calculation process continues to step S503, where one path is selected. At step S504, it is determined whether the path contains a segment whose height is much smaller than the estimated character height (i.e., the distance between the top and bottom baselines in FIG. 7A). If so, then the path will be eliminated and no more score calculation is needed. Otherwise the process proceeds to step S505 for calculating a path score for the path. Assuming the path consists of multiple segments denoted as $Seg_1$, $Seg_2$, ... $Seg_m$, for each segment, the top one candidate on the recognition list is selected, and as a result, a decoding path is formed, which includes $R_{11}$, $R_{12}$, ... $R_{1m}$. The score for such a decoding path is calculated using the following equation:

$$S_{path} = a*(S_{11}*Len_1 + S_{12}*Len_2 + \ldots + S_{1m}*Len_m) + b*\min(S_{11}, S_{12}, \ldots S_{1m})$$

where $Len_1$, $Len_2$ ... $Len_m$ represent the segment lengths for $Seg_1$, $Seg_2$, ... $Seg_m$, respectively, ($S_{11}$, $S_{12}$, ... $S_{1m}$) are corresponding scores for ($R_{11}$, $R_{12}$, ... $R_{1m}$), min means the minimization function, while a and b are pre-defined constants.

After the path score is calculated for the selected path using the above equation, at step S506, the score-calculating process further determines whether there is any unprocessed path in the image, and if so, the unprocessed path is selected at step 507 for score calculation by repeating the steps S504 to S506. Otherwise the process ends when there is no more unprocessed path left in the image.

Figure 9:
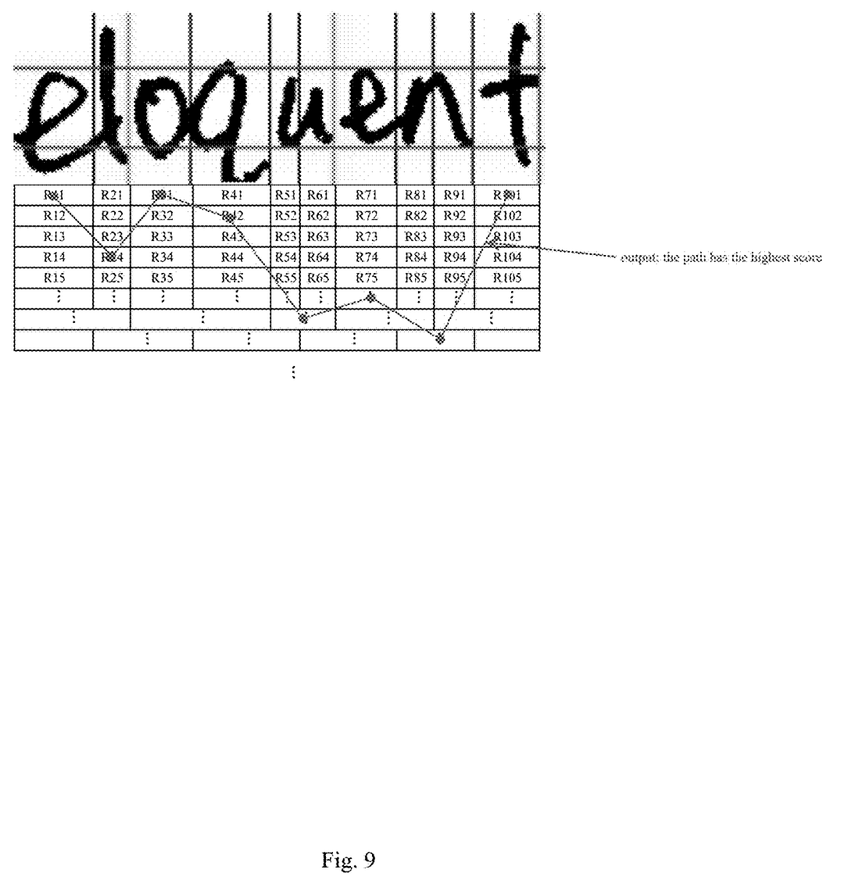
FIG. 9 provides an exemplary path having the highest score as a result of the path score calculation sub-routine in FIG. 6 according to embodiments of the present invention.

Based on the calculated scores for each decoding path, the algorithm identifies a path with the highest score, which path will be used for interpreting the handwritten characters in the input image. For example, as shown in FIG. 9, the path with the highest score comprises the recognition results of $R_{11}$, $R_{24}$, $R_{31}$, ... $R_{101}$. This path will be provided as the final output at step 107 of FIG. 2, which will serve as the basis for handwriting recognition of the input image.

It will be apparent to those skilled in the art that various modification and variations can be made in the above-described method and system of the present invention without departing from the spirit or scope of the invention. Thus, it is intended that the present invention cover modifications and variations that come within the scope of the appended claims and their equivalents.

What is claimed is:
1. A method for handwriting recognition, comprising:
    detecting connected regions in an input image comprising handwritten characters;
    determining a plurality of segmentation positions of the input image;
    obtaining multiple alternative paths of the input image, each path containing one or more segments, each path covering all of the connected regions of the input image, the multiple alternative paths being different from each other;
    for each path:
        obtaining a plurality of recognition results for the segments of the path, wherein each recognition result represents a character candidate for a corresponding segment;
        obtaining a plurality of scores corresponding to the recognition results of the segments; and
        calculating a path score for the path based on segment lengths and the scores corresponding to the recognition results of the segments using the following equation: $S_{path} = a*(S_{11}*Len_1 + S_{12}*Len_2 + \ldots + S_{1m}*Len_m) + b*\min(S_{11}, S_{12}, \ldots S_{1m})$, wherein $Len_1$, $Len_2$ ... $Len_m$ represent respective segment lengths for $Seg_1$, $Seg_2$, ... , $Seg_m$ of the path, ($S_{11}$, $S_{12}$, ... , $S_{1m}$) represent scores corresponding to recognition results ($R_{11}, R_{12}, \ldots R_{1m}$) of a decoding path, min means the minimization function, and a and b are pre-defined constants; and identifying the path with the highest path score and using that path to interpret the handwritten characters in the input image.

2. The method of claim 1, wherein the recognition results ($R_{11}, R_{12}, \ldots R_{1m}$) of the decoding path represent top character candidates for $Seg_1$, $Seg_2 \ldots Seg_m$ of the path.

3. The method of claim 1, further comprising:
estimating an upper baseline and a lower baseline for the input image based on the connected regions; and
estimating a character height based on the upper and lower baselines.

4. The method of claim 3, wherein the upper and lower baselines are estimated by:
detecting top and bottom positions of each connected region of the input image;
clustering the top positions into a first higher center and a first lower center, wherein the first lower center is selected as the upper baseline; and
clustering the bottom positions into a second higher center and a second lower center, wherein the second higher center is selected as the lower baseline.

5. The method of claim 1, wherein the segmentation positions are determined by:
obtaining a top contour and a bottom contour of the input image;
selecting a plurality of extremum points in the top and bottom contours as potential segmentation positions; and
for each of the plurality of potential segmentation positions, drawing a vertical line at the potential segmentation position, determining whether the vertical line crosses a foreground of the input image more than two times and if so, deleting the potential segmentation position, and determining whether the vertical line crosses a circle in the foreground and if so, deleting the potential segmentation position.

6. The method of claim 5, wherein the foreground of the input image comprises a connected region of black pixels.

7. The method of claim 5, further comprising:
for each of the plurality of potential segmentation positions, if the vertical line does not cross the foreground of the input image more than two times and does not crosses a circle in the foreground, keeping the potential segmentation position as a segmentation position.

8. The method of claim 1, wherein the segmentation positions define one or more segments in the input image.

9. The method of claim 1, wherein each segment comprises one or more non-overlapping black pixels in the input image.

10. The method of claim 1, wherein the recognition results and corresponding scores are obtained by a character classifier.

11. A computer program product comprising a computer usable non-transitory medium having a computer readable program code embedded therein for controlling a data processing apparatus, the computer readable program code configured to cause the data processing apparatus to execute a process for handwriting recognition, the process comprising:
detecting connected regions in an input image comprising handwritten characters;
determining a plurality of segmentation positions of the input image;
obtaining multiple alternative paths of the input image, each path containing one or more segments, each path covering all of the connected regions of the input image, the multiple alternative paths being different from each other;
for each path:
obtaining a plurality of recognition results for the segments of the path, wherein each recognition result represents a character candidate for a corresponding segment;
obtaining a plurality of scores corresponding to the recognition results of the segments; and
calculating a path score for the path based on segment lengths and the scores corresponding to the recognition results of the segments using the following equation: $S_{path}=a*(S_{11}*Len_1+S_{12}*Len_2+ \ldots + S_{1m}*Len_m)+b*\min(S_{11}, S_{12}, \ldots S_{1m})$, wherein $Len_1$, $Len_2 \ldots Len_m$ represent respective segment lengths for $Seg_1$, $Seg_2, \ldots, Seg_m$ of the path, ($S_{11}, S_{12}, \ldots, S_{1m}$) represent scores corresponding to recognition results ($R_{11}, R_{12} \ldots R_{1m}$) of a decoding path, min means the minimization function, and a and b are pre-defined constants; and
identifying the path with the highest path score and using that path to interpret the handwritten characters in the input image.

12. The computer program product of claim 11, wherein the recognition results ($R_{11}, R_{12}, \ldots R_{1m}$) of the decoding path represent top character candidates for $Seg_1$, $Seg_2, \ldots Seg_m$ of the path.

13. The computer program product of claim 11, wherein the segmentation positions define one or more segments in the input image.

14. The computer program product of claim 11, wherein each segment comprises one or more non-overlapping black pixels in the input image.

15. The computer program product of claim 11, wherein the recognition results and corresponding scores are obtained by a character classifier.

16. A computer program product comprising a computer usable non-transitory medium having a computer readable program code embedded therein for controlling a data processing apparatus, the computer readable program code configured to cause the data processing apparatus to execute a process for handwriting recognition, the process comprising:
detecting connected regions in an input image comprising handwritten characters;
estimating an upper baseline and a lower baseline for the input image based on the connected regions, wherein the upper and lower baselines are estimated by:
detecting top and bottom positions of each connected region of the input image;
clustering the top positions into a first higher center and a first lower center, wherein the first lower center is selected as the upper baseline; and
clustering the bottom positions into a second higher center and a second lower center, wherein the second higher center is selected as the lower baseline;
estimating a character height based on the upper and lower baselines;
determining a plurality of segmentation positions of the input image;
obtaining multiple alternative paths of the input image, each path containing one or more segments, each path covering all of the connected regions of the input image, the multiple alternative paths being different from each other;

for each path:
obtaining a plurality of recognition results for the segments of the path, wherein each recognition result represents a character candidate for a corresponding segment;
obtaining a plurality of scores corresponding to the recognition results of the segments; and
calculating a path score for the path based on segment lengths and the scores corresponding to the recognition results of the segments; and identifying the path with the highest path score and using that path to interpret the handwritten characters in the input image.

17. A computer program product comprising a computer usable non-transitory medium having a computer readable program code embedded therein for controlling a data processing apparatus, the computer readable program code configured to cause the data processing apparatus to execute a process for handwriting recognition, the process comprising:

detecting connected regions in an input image comprising handwritten characters;
determining a plurality of segmentation positions of the input image, wherein the segmentation positions are determined by:
obtaining a top contour and a bottom contour of the input image;
selecting a plurality of extremum points in the top and bottom contours as potential segmentation positions; and
for each of the plurality of potential segmentation positions, drawing a vertical line at the potential segmentation position, determining whether the vertical line crosses a foreground of the input image more than two times and if so, deleting the potential segmentation position, and determining whether the vertical line crosses a circle in the foreground and if so, deleting the potential segmentation position;

obtaining multiple alternative paths of the input image, each path containing one or more segments, each path covering all of the connected regions of the input image, the multiple alternative paths being different from each other;

for each path:
obtaining a plurality of recognition results for the segments of the path, wherein each recognition result represents a character candidate for a corresponding segment;
obtaining a plurality of scores corresponding to the recognition results of the segments; and
calculating a path score for the path based on segment lengths and the scores corresponding to the recognition results of the segments; and identifying the path with the highest path score and using that path to interpret the handwritten characters in the input image.

18. The computer program product of claim 17, wherein the foreground of the input image comprises a connected region of black pixels.

19. The computer program product of claim 17, wherein the process further comprises:

for each of the plurality of potential segmentation positions, if the vertical line does not cross the foreground of the input image more than two times and does not crosses a circle in the foreground, keeping the potential segmentation position as a segmentation position.

* * * * *